United States Patent [19]

Zarur

[11] 4,360,380
[45] Nov. 23, 1982

[54] PROCESS FOR RECOVERY OF METAL VALUES FROM SLUDGES

[75] Inventor: George L. Zarur, Springfield, Va.

[73] Assignee: World Resources Company, McLean, Va.

[21] Appl. No.: 185,463

[22] Filed: Sep. 9, 1980

[51] Int. Cl.$^3$ ............................................. C22B 15/00
[52] U.S. Cl. ................................. 75/97 R; 75/118 R; 423/1; 423/658.5; 110/346
[58] Field of Search ........................... 75/97, 101, 118; 110/346; 423/1, 24, 439, 658.5; 210/710, 769; 122/2

[56] References Cited

U.S. PATENT DOCUMENTS

| | | | |
|---|---|---|---|
| 1,818,846 | 8/1931 | Giles | 75/118 R |
| 4,033,763 | 7/1977 | Markels | 75/118 R |
| 4,162,294 | 7/1979 | Witzke | 423/128 X |
| 4,216,012 | 8/1980 | Krofchak | 423/658.5 |

OTHER PUBLICATIONS

"The Removal and Recovery of Metals from Sludge and Sludge Incinerator Ash", Barry G. Oliver and John H. Carey–Ontario Ministry of Environment, Pollution Control Branch, 135 St. Clair Avenue, West, Toronto, Ontario, Canada M4V 1P5–Feb. 1976, pp. 3 and 44.

*Primary Examiner*—G. O. Peters
*Attorney, Agent, or Firm*—Dowell & Dowell

[57] ABSTRACT

A process for the recovery of selected metal values from silica containing sludges including incineration of the sludge to degrade organic components, followed by acid leaching of the ash, followed by hydrometallurgical recovery of metal values from the remaining solid and liquid residues, wherein the incineration step is carried out at a temperature below the slagging temperature of silicates, whereby to avoid the occluding of metal values in glass matrices which are not attacked by subsequent acid leaching and hydrometallurgical steps.

5 Claims, 1 Drawing Figure

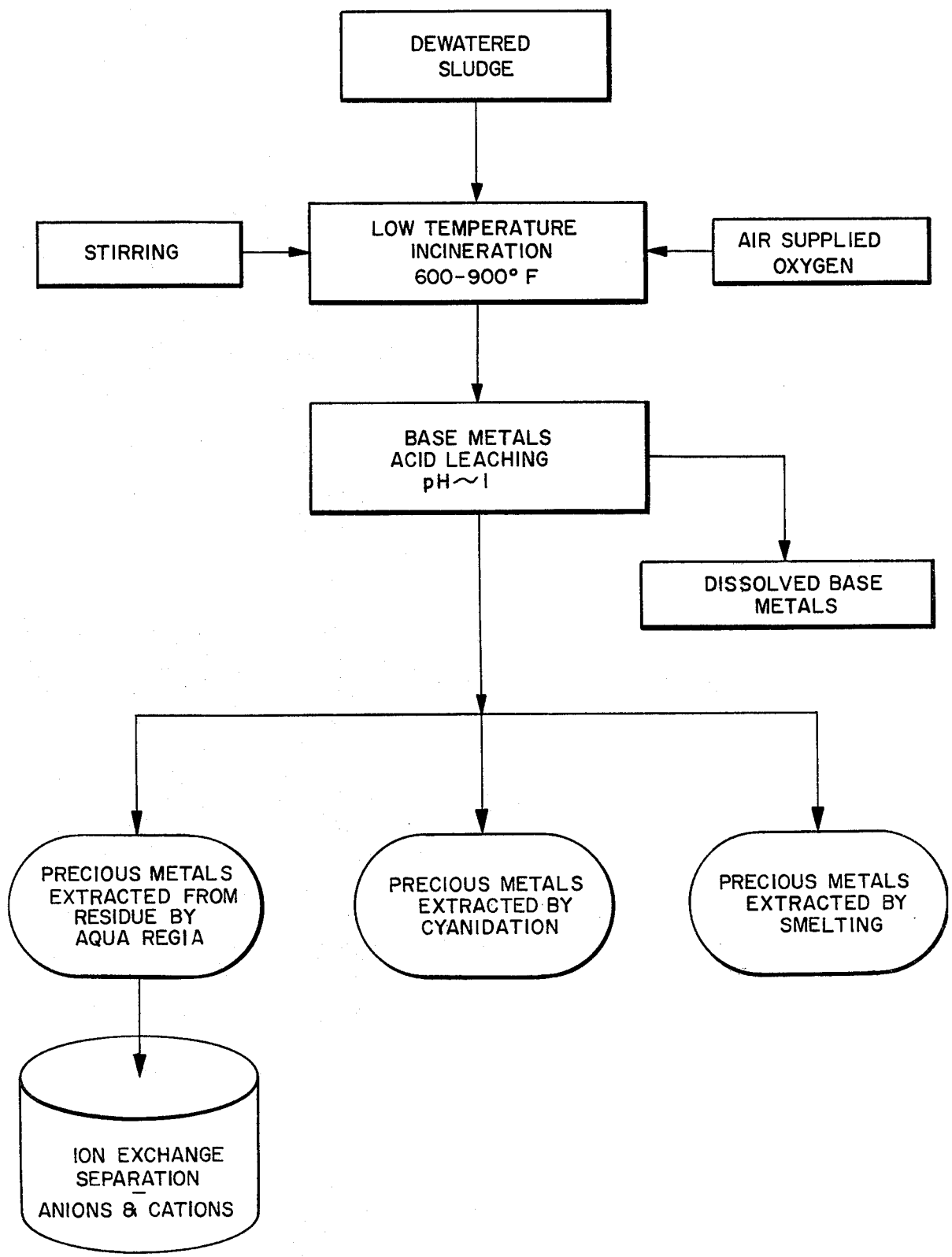

PROCESS FOR RECOVERY OF METAL VALUES FROM SLUDGES

BACKGROUND AND PRIOR ART

The accumulation of heavy toxic metals in wastewater sludges has long been recognized as a major problem in sludge disposal. The origin of the mineral values may variously be industrial discharges, urban runoff and sewage, or simply a high natural mineral content in the water itself. Moreover, it is apparent that as a result of the rising dollar costs of metals contained in these wastewaters, the recovery of certain metal values has become economically feasible. Particularly in cases where the sludge has a high content of organic matter, elimination of the organic matter is a major step early in the over-all process of treating the sludge and concentrating the mineral values. A number of different dewatering approaches are used, including physical separation and/or drying of the sludge in sunlight in arid climates. In some cases it is economical to treat the sludge directly with mineral acids to degrade the organic matter, but usually the cost of direct acid treatment becomes prohibitive because of the cost of the quantity of acids required to fully break down the sludge in this manner.

The usual way of degrading the organic matter in the sludge is by incineration, and this treatment is frequently performed on sludges having a high content of silicates. It is to this type of treatment of sludges that the present invention is directed.

Incineration of sludges is generally carried out at high temperatures, of the order of 1800 degrees F and above, using specially built multiple hearth furnaces which achieve high enough temperatures to rapidly destroy odors and pathogens. However, in the case of sludges having substantial silica content these high temperatures tend to induce reactions between the silica and contained metal salts, which reactions lead to the formation of glass matrices which occlude metal values inside their cellular walls. This is a very serious disadvantage because it renders the occluded metal values virtually inaccessible to conventional hydrometallurgical extraction processes, whereby significant proportions of the total metal values in the sludges do not become separated by acid leaching of incinerated sludge ash. Processes of the type in which metal values become bound in silica glass matrices are typically found in U.S. Pat. No. 4,033,763 to Markels, particularly including processes wherein recovery of metal values from the ash is done by hydrometallurgy and by cyanide extraction.

The deleterious effect of this phenomenon on efforts to recover metal values from sludge ash is not well recognized in the prior art. In U.S. Pat. No. 3,974,783 to Flynn, the inventor discusses the fact that the formation of slag during high temperature sludge incineration is damaging to incinerator parts on which the slag is formed. This patent therefore sets out to reduce the amount of slag formed, and to make that slag which is formed softer and more easily breakable from the incinerator parts. This is accomplished by adding certain metals to the sludge including copper, cobalt, manganese, iron or calcium which lowers the ignition temperature of carbon, and by adding magnesium compounds to the sludge prior to incineration. However, this patent is not directed toward preventing the formation of glass matrices in the ash which tend to occlude metal values and thereby reduce the effectiveness of subsequent hydrometallurgical treatment of the ash.

U.S. Pat. No. 4,133,273 to Glennon mixes other waste materials with sludges so that the mixed materials help fuel each other during incineration, but there is no discussion of the effect of slagging due to high temperature incineration.

The metal values present in the sludge can be classified in three different groups as follows:

(1) the noble metals including Ag, Au, Pd and Pt;

(2) the base and transition metals including but not restricted to Al, Fe, Cu, Cr, Sn, Ga, Zn, Mn, Tl, Cd, Co, Mo, etc; and (3) the ions typically of sulfate, nitrate, and phosphate, which ions are also extracted during the acid leach step, and can be recovered by suitable ion exchange techniques.

Extraction of the metals of these groups can be efficiently achieved by leaching the ash directly with hot acids, such as nitric, hydrochloric and sulfuric, to separate the content into dissolved metal values and residue of the ash which is mainly silica but includes the noble metals also. Final extraction is then achieved by performing such other hydrometallurgical recovery steps as may be necessary to isolate and recover individual metals. However, those metal values which have become occluded inside insoluble glass matrices will generally remain inside the glass matrices and be lost with the residue because they do not respond to subsequently performed acid leach and hydrometallurgical recovery steps. The present invention addresses itself to the steps required to prevent formation of such glass matrices, whereby substantially all of the metal values can be recovered from the ash without a significant percentage thereof being inaccessible to such further processing. Typical hydrometallurgical recovery steps are outlined in examples presented in this specification, although these steps are not, of themselves, considered novel.

THE INVENTION

For purposes of the present invention, it is assumed that the sludge has been dewatered at least to a moisture content of about 30 to 40 percent, the sludge then being capable of sustaining combustion so that cost-effective incineration can be achieved for oxidizing the organic matter. The sludge is then ground, classified, and subsequently incinerated by means of suitable equipment such as a rotary kiln, a multiple hearth furnace, a fluidized-bed combustor, or other suitable furnace. The incineration step must degrade and oxidize the organic material in the sludge, dispose of the odors, and destroy the pathogens, however at the same time avoiding the formation of slag or glass matrices. This can be done by low temperature incineration where the temperature in the incinerator is kept below the slagging temperature of the silica but high enough to oxidize the organic matter. The slagging temperature of silica is about 1400° F. Therefore, if the incineration is carried out at a temperature in the 600° to 900° F. range, and in the presence of an ample or excess supply of oxygen with adequate stirring, it is found that the organic content is burned off without formation of undesirable silicates. The incineration process modified in the above manner provides an ash which can be subjected directly to hydrometallurgical extraction processing with the expectation of full recovery of the metal values, since no substantial proportion of the metal values will be occluded in silica glass and thereby rendered unrecoverable by hydrometallurgical methods. The novelty of this disclosure rests in the application of silicate chemistry prior to wet sludge incineration rather than in the application only of conventional hydrometallurgical extraction techniques which are known in the prior art. Such silicate chemistry is also well-known per se in connection with ore benefication techniques. In general, when silica or other silicates existing in the sludge are heated above the slagging temperature in the presence of various metals, or metallic compounds, including iron, aluminium, calcium, sodium, potassium, magnesium, manganese, zinc, etc, various silicates of these metals are formed which appear as polymer structures having interstices in which metal values sought to be recovered are occluded. Since these silicates are predominantly insoluble in water and in the leaching acids, the metal values become inaccessible to hydrometallurgical recovery. Silicate chemistry is more fully discussed in "Silicate Science"; W. Eitel, editor (several volumes) 1965, Academic Press, N.Y. The varying and inhomogeneous nature of sludges prevents accurate prediction of the their slagging temperatures, but in any case it is believed that the temperature will not be below about 1400° F.

OBJECTS AND ADVANTAGES

It is the principle object of this invention to increase the percentage recovery of metal values from an incinerated sludge ash by hydrometallurgical treatment resulting in substantial elimination of glass matrix forming materials, which tend to form in the ash during high temperature interaction between silica in the sludge and various metal salts. The avoidance of formation of such glass-like slags is achieved by reduction of the temperature at which incineration is carried out to a temperature below the slagging temperature. The yield of metal values during subsequent hydrometallurgical steps is thereby increased because metal values, which would otherwise become occluded inside glass matrices, are not thus occluded and are therefore directly accessible to chemical extraction processes taking place during subsequent hydrometallurgical steps. The glass matrices formed at temperatures in the normal 1800° F. incineration temperature range are generally of types which are not leachable by the mineral acids used in the hydrometallurgical steps. Analysis shows that for sludges containing a high proportion of silica and certain common metals and salts, after high temperature incineration, as much as 60 to 70 percent of the metal values may be entrapped within the formed glass matrices which are predominantly insoluble, thereby making them hydrometallurgically unrecoverable. Special laboratory treatment of these glass matrices in order to release the occluded values confirms the high proportion of total metal values which became occluded in the glass matrices as a result of high temperature incineration.

It is another important object of the invention to provide a method of preventing the formation of glass matrices during incineration by steps which do not require the addition of chemicals to the sludge in order to achieve the purpose. The present invention teaches a process in which the only additional investment for the purpose of preventing the formation of silica glass matrices in the ash is an investment of time, a greater residence time being necessary in the incinerator in order to achieve full degradation of the organic matter and complete destruction of odors and pathogens when incineration is carried out in the 600°–900° F. temperature range.

Still another object of the invention is to provide an improved process in which incineration is carried out at a temperature below the slagging temperature of the silica, while at the same time introducing into the incineration step an increased flow of air-supplied oxygen, and while stirring the sludge and ash in order to induce complete burning of the organic matter. When this is done substantially no carbon remains in the ash after the incineration step has been completed. The increased residence time in the incinerator for lower temperature incineration is of the order of 50 to 100 percent.

Still another object of the invention is to improve the yield of metal values recoverable from an incinerated sludge ash by carrying out the incineration step at a lowered temperature, whereby any loss of metal values in the gaseous phase is also avoided. This improvement has also been discovered in connection with mining techniques as indicated in a Bureau of mines report 1979 RI 8390.

It is a more general object of this invention to provide an improved incineration step as a result of which an incinerated sewage ash is produced which emerges from the incinerator in optimum condition for acid leaching, whereby the hydrometallurgical steps required to separate out the various precious and base metal values can be efficiently carried out.

Other objects and advantages of the invention will become apparent during the following discussion of the drawing.

THE DRAWING

The drawing illustrates the steps of a process for the incineration of a dewatered sludge followed by the hydrometallurgical recovery of metal values from the resulting ash.

Referring to the drawing, and assuming that the process commences with a wet sludge, it is necessary to dewater the sludge until its moisture content is only about 30 to 40 percent before the sludge can be autogenously incinerated. The process by which the dewatering is done is not considered novel in the present disclosure, and may be achieved by any one of a number of well-known steps.

Once the sludge is dewatered, the next step is incineration at a reduced temperature, as compared with the usual type of incineration taking place at or above 1800° F. The slagging temperature for glass-like silica compounds is in the vicinity of 1400° F., and therefore the present incineration step is carried out below that temperature, and preferably in the 600° to 900° F. range. During this incineration step, oxygen is supplied by forced-air blowers at a relatively high rate, the blowers introducing air through the incinerator in sufficient quantity to achieve complete oxidizing of organic materials in the sludge. Moreover, it is found that stirring of the sludge to keep the temperature throughout relatively uniform and to increase the exposure of organic materials to the oxygen, greatly improves the process. Stirring and forced air circulation are of course used in one form or another in many sludge incinerators and are not, per se, considered a novel feature. The residence time of dewatered sludge in an incinerator operating in the 1800° range is typically of the order of 20 to 30 minutes. However when the temperature is lowered into the 600°–900° range, the residence time should be increased by 50 to 100 percent.

The ash which is removed from the incinerator once the organic matter is completely oxidized, is allowed to cool somewhat, and then is subjected to hot acid leaching at a temperature of 140° F. or higher using a mineral acid such as sulfuric, nitric or hydrochloric acid, usually sulfuric acid being preferred. The acid is introduced into the ash until the resulting slurry has a pH approaching unity. The exact pH need not be so closely specified but should not exceed 1.5. The residence time in the acid leaching step should be at least 30 minutes in order to achieve substantially complete desolving of the base and intermediate metal values. When such dissolving is substantially complete, the dissolved metal values and remaining acid solution are separated from the solid residue. The residue contains most of the precious metals together with undesirable residual materials such as silica and gypsum. The dissolved solution can then be either discarded if recovery of the base metal values therein is not desired, or can be subjected to such further metallurgical steps as are necessary to recover metal values from the acid solution, these steps generally being well-known in the prior art. The solid residue after washing to remove residual acid and base metal components, can then be further treated by a number of different processes as discussed below to recover the various precious metals contained therein.

One of the ways of recovering the precious metals is to extract them from the residue by introducing hot aqua regia at a temperature of 140° F. or higher which dissolves the precious metals and puts them in solution as ions. The various metals can then be recovered by suitable ion exchange columns, which are specific either for gold or silver, for example. Various suitable resins are commercially available including NSN-280, NBL-17, and AG-50W series. Reference is also made to "Analytical Chemistry", 1975, P.47 by L. L. Sundberg, and "Los Alamos Scientific Laboratory Report" #LA-70-83, 1976.

The solid residue from the base metal leaching step can also be treated for extraction of precious metals by cyanidation steps which are well-known in the prior art. A typical cyanide extraction step is described as Example No. 6 appearing in column 10 of Markels U.S. Pat. No. 4,033,763 mentioned above in this specification.

Another known way of recovering the precious metals from the solid residue of the base metal leaching step is by smelting. In a typical process of this type the solid residue can be mixed with an ore, for example of copper, or zinc or lead, and the ore can then be treated by pyrometallurgical steps including smelting steps as set forth in Examples 2, 3 and 4 of the above Markels U.S. Pat. No. 4,033,763.

The following examples illustrate the process.

EXAMPLE 1

Fully dried sludge was ball milled and incinerated for 45 minutes in an oven at 600° F. with oxygen supplied by forced air flow through the oven and with periodic stirring. Complete oxidation was indicated in the incinerator by disappearance of red hot zones in the ash, and upon cooling by the lack of black carbon particulates. The ash was then leached with concentrated sulfuric acid for two hours, the acid comprising about 40 percent by weight of the ash entered into the leaching vat. The leaching was carried out at a temperature of about 140° F., and at the end of two hours the solution was allowed to cool and settle, and the remaining sulfuric acid solution was drawn off taking with it dissolved base and intermediate metal values. The solid residue was further washed with 5 percent sulfuric acid to remove any residual dissolved values. Analysis showed that better than 90 percent of the total base metal content had been removed from the ash. The weight loss associated with this extraction was approximately 15 percent. Further analysis showed that the residual solids after the sulfuric acid leach comprised mostly silica and gypsum together with the precious metal content. Some silver was extracted by the sulfuric acid leach. The residue from the above leaching step still contained substantial sulfuric acid, and had to be neutralized before cyanidation could be proceeded with. The pH was then adjusted to about 11 by the addition of lime and ammonium hydroxide.

Cyanidation was then carried out as set forth in Example No. 6 in the Markels U.S. Pat. No. 4,033,763 using 2 percent sodium cyanide with a 30 percent ratio of ash to cyanide solution. The cyanide process extracted about 80 to 85 percent of the silver, although longer contact time using fresh cyanide solutions and higher ammonia content will somewhat increase the recovery rate. The gold content, however, was unaffected by the addition of ammonia and 90 to 95 percent extraction efficiencies were readily obtained.

EXAMPLE 2

This example is similar to Example No. 1 through the sulfuric acid leach step, but instead of cyanidation, the precious metals were recovered by treatment of the leached residue using aqua regia at about 180° F. Concentrated aqua regia was added in the amount of about 40 percent by weight, and at the end of four hours the solution was withdrawn, containing both residual heavy metals and the precious metals. During extraction of the precious metals acid consumption was minimal due to the low pH level of the solids after the sulfuric acid leach step. A trace of silver residue was left, however. The extraction of precious metals from aqua regia solution was carried out by passing the solution through ion-exchange columns that were respectively specific for gold and for silver using the above-mentioned commercially available resins for this purpose.

EXAMPLE 3

This example relates to the recovery from the residue of the base metal leaching step to retrieve precious metals extracted by smelting, and the steps in this example are similar to those which are used to recover metals from incinerated ash as discussed in connection with Examples 3 and 4 of the Markels U.S. Pat. No. 4,033,763, owned by the assignee of this disclosure.

The present invention is not to be limited to the exact form discussed in the examples for obviously the improved process has greater utility within the limitations of the attached claims.

I claim:

1. A process for improving the yield of metal values recovered by hydrometallurgical extraction after incineration of organic sewage sludge which has as a principal ingredient organic matter with trace quantities of certain metal values occluded therein and which has inorganic matter including silica, alumina, lime and other uncombined metal values, and wherein the organic content of the dewatered sewage sludge is degraded by incineration at a temperature controlled to leave the silica substantially unfused and to oxidize the organic matter to produce an ash suitable for hydrometallurgical processing to recover selected metal values, the process comprising:

(a) incinerating dewatered organic sewage sludge at a controlled temperature below the fusion temperature of silica to degrade the sewage sludge and release the occluded metal values while continuously preventing complexing of metal values released by degradation of the organic matter with glasslike matrices in the resulting ash;

(b) continuing the incineration at said controlled temperature without fusing said inorganic matter until all the organic matter is oxidized while introducing excess oxygen and stirring the sludge;

(c) subsequently acid leaching the ash to produce a liquid component containing the metal values and solid components containing the unfused silica and other inorganic matter; and (d) recovering selected metal values from said liquid component.

2. The process as claimed in claim 1, wherein the incinerating temperature is below 1400° F.

3. The process as claimed in claim 1, wherein the incinerating temperature is within the range 600° to 900° F.

4. The process as claimed in claim 1, wherein said leaching is carried out using an acid selected from the group including sulfuric, nitric and hydrochloric acid.

5. The process as claimed in claim 1, wherein said recovered metal values are selected from a group of noble metals including Ag, Au, Pd and Pt, and from a group of base and transition metals including Al, Fe, Cu, Cr, Sn, Ga, Zn, Mn, Tl, Cd, Co, Mo, and Ni.

* * * * *